(12) United States Patent
Yi et al.

(10) Patent No.: US 8,416,678 B2
(45) Date of Patent: Apr. 9, 2013

(54) METHOD FOR REPAIRING AN ERROR DEPENDING ON A RADIO BEARER TYPE

(75) Inventors: Seung June Yi, Gyeonggi-do (KR);
Young Dae Lee, Gyeonggi-do (KR);
Sung Duck Chun, Gyeonggi-do (KR);
Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/739,282

(22) PCT Filed: Oct. 29, 2008

(86) PCT No.: PCT/KR2008/006375
§ 371 (c)(1),
(2), (4) Date: Apr. 22, 2010

(87) PCT Pub. No.: WO2009/057941
PCT Pub. Date: May 7, 2009

(65) Prior Publication Data
US 2010/0246382 A1 Sep. 30, 2010

Related U.S. Application Data

(60) Provisional application No. 60/983,304, filed on Oct. 29, 2007.

(30) Foreign Application Priority Data
Oct. 29, 2008 (KR) .................. 10-2008-0106298

(51) Int. Cl.
*H04J 1/16* (2006.01)
(52) U.S. Cl.
USPC .......................................... 370/216

(58) Field of Classification Search .......... 370/242–252, 370/310–350, 216–228
See application file for complete search history.

(56) References Cited

U.S. PATENT DOCUMENTS

| | | |
|---|---|---|
| 5,878,041 A | 3/1999 | Yamanaka et al. |
| 6,445,917 B1 | 9/2002 | Bark et al. |

(Continued)

FOREIGN PATENT DOCUMENTS

| | | |
|---|---|---|
| CN | 1339903 A | 3/2002 |
| CN | 1390425 A | 1/2003 |

(Continued)

OTHER PUBLICATIONS

Jiang, ASUSTeK Computer Inc., HFN de-synchronization detection with Integrity Protection scheme in a wireless communications. U.S. Appl. No. 60/863,800.*

(Continued)

*Primary Examiner* — Jeffrey M Rutkowski
*Assistant Examiner* — Juvena Loo
(74) *Attorney, Agent, or Firm* — Morgan, Lewis & Bockius LLP

(57) ABSTRACT

A method of re-establishing a radio bearer in a wireless communication system is disclosed. The method of re-establishing a radio bearer of a user equipment in a wireless communication system comprises establishing a radio bearer; identifying whether an error has occurred in the radio bearer; and selectively re-establishing the radio bearer or all radio bearers of the user equipment in accordance with a type of the radio bearer if the error has occurred in the radio bearer.

7 Claims, 15 Drawing Sheets

U.S. PATENT DOCUMENTS

| | | |
|---|---|---|
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,862,450 B2 | 3/2005 | Mikola et al. ............... 455/438 |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. ............... 370/474 |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo ............................ 370/346 |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. ........................ 370/470 |
| 2002/0114280 A1 | 8/2002 | Yi et al. |
| 2002/0122411 A1 | 9/2002 | Zimmerman et al. |
| 2003/0002472 A1 | 1/2003 | Choi et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu ............................... 370/469 |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. ............... 709/227 |
| 2004/0153852 A1 | 8/2004 | Wu |
| 2004/0156330 A1 | 8/2004 | Yi et al. |
| 2004/0184438 A1 | 9/2004 | Terry ............................ 370/349 |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. ............ 370/235 |
| 2005/0157696 A1 | 7/2005 | Yamamoto |
| 2005/0164683 A1 | 7/2005 | Roberts et al. ............. 455/412.2 |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. ............. 370/349 |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. ..................... 370/329 |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. ................. 455/39 |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0252445 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. ................. 370/329 |
| 2006/0280145 A1 | 12/2006 | Revel et al. |
| 2006/0281456 A1 | 12/2006 | Roberts et al. |
| 2007/0032255 A1 | 2/2007 | Koo et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov ......................... 370/329 |
| 2007/0117579 A1 | 5/2007 | Cai et al. |
| 2007/0153788 A1 | 7/2007 | Yi et al. ........................ 370/389 |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0258591 A1* | 11/2007 | Terry et al. ................... 380/247 |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. ................. 370/331 |
| 2008/0008152 A1 | 1/2008 | Lohr et al. ................... 370/342 |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. ....................... 370/394 |
| 2008/0084851 A1 | 4/2008 | Kim et al. |
| 2008/0089285 A1 | 4/2008 | Pirskanen et al. ........... 370/329 |
| 2008/0101609 A1* | 5/2008 | Jiang ............................ 380/274 |
| 2008/0146242 A1 | 6/2008 | Alanara et al. |
| 2008/0151830 A1 | 6/2008 | Leppisaari et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |

| | | | | | | |
|---|---|---|---|---|---|---|
| 2008/0233940 A1 | 9/2008 | Jen | | JP | 2006-121562 A | 5/2006 |
| 2008/0233941 A1 | 9/2008 | Jen | | JP | 2006-311543 A | 11/2006 |
| 2008/0261581 A1 | 10/2008 | Cai | | JP | 2007-116639 A | 5/2007 |
| 2008/0268878 A1 | 10/2008 | Wang et al. ............ 455/458 | | JP | 2007-312244 | 11/2007 |
| 2008/0273482 A1 | 11/2008 | Lee et al. | | JP | 2009-520125 A | 6/2008 |
| 2008/0273610 A1 | 11/2008 | Malladi et al. | | JP | 2009-521893 A | 6/2009 |
| 2008/0305819 A1 | 12/2008 | Chun et al. ............ 455/509 | | KP | 10-2006-0134058 A | 12/2006 |
| 2008/0318578 A1 | 12/2008 | Worrall | | KR | 10-2001-0045783 A | 6/2001 |
| 2009/0005058 A1 | 1/2009 | Kazmi et al. ............ 455/452.1 | | KR | 10-2001-0062306 | 7/2001 |
| 2009/0016301 A1 | 1/2009 | Sammour et al. | | KR | 10-2002-0004645 A | 1/2002 |
| 2009/0034455 A1 | 2/2009 | Lee et al. | | KR | 10-2002-0012048 A | 2/2002 |
| 2009/0041240 A1 | 2/2009 | Parkvall et al. | | KR | 10-2002-0097304 A | 12/2002 |
| 2009/0046631 A1 | 2/2009 | Meylan et al. ............ 370/328 | | KR | 10-2003-0060055 A | 7/2003 |
| 2009/0046667 A1 | 2/2009 | Pelletier et al. | | KR | 10-2003-0068743 A | 8/2003 |
| 2009/0046695 A1 | 2/2009 | Jiang | | KR | 10-20030087914 A | 11/2003 |
| 2009/0104890 A1 | 4/2009 | Wang et al. | | KR | 10-2004-0034398 A | 4/2004 |
| 2009/0116434 A1 | 5/2009 | Lohr et al. ............ 370/342 | | KR | 10-2004-0039944 A | 5/2004 |
| 2009/0119564 A1 | 5/2009 | Sagfors et al. | | KR | 10-2004-0072961 | 8/2004 |
| 2009/0156194 A1 | 6/2009 | Meylan | | KR | 10-2005-0022988 A | 3/2005 |
| 2009/0175163 A1 | 7/2009 | Sammour et al. | | KR | 10-2005-0062359 | 6/2005 |
| 2009/0190480 A1 | 7/2009 | Sammour et al. | | KR | 10-2005-0081836 | 8/2005 |
| 2009/0203374 A1 | 8/2009 | Chun et al. ............ 455/425 | | KR | 10-2005-0092874 | 9/2005 |
| 2009/0232076 A1 | 9/2009 | Kuo | | KR | 10-2005-0099472 | 10/2005 |
| 2009/0259908 A1 | 10/2009 | Gollapudi ............ 714/748 | | KR | 10-2005-0100882 A | 10/2005 |
| 2009/0305712 A1 | 12/2009 | Franceschini et al. | | KR | 10-20050103127 A | 10/2005 |
| 2010/0014466 A1 | 1/2010 | Meyer et al. ............ 370/328 | | KR | 10-2005-0118591 A | 12/2005 |
| 2010/0091750 A1 | 4/2010 | Lee et al. | | KR | 10-2006-0004935 | 1/2006 |
| 2010/0128648 A1 | 5/2010 | Lee et al. | | KR | 10-2006-0014910 | 2/2006 |
| 2010/0142429 A1 | 6/2010 | Yi et al. | | KR | 10-2006-0029452 | 4/2006 |
| 2010/0142457 A1 | 6/2010 | Chun et al. | | KR | 10-20060042858 A | 5/2006 |
| 2010/0157904 A1 | 6/2010 | Ho et al. | | KR | 10-2006-0069378 A | 6/2006 |
| 2010/0172282 A1 | 7/2010 | Zhang et al. | | KR | 10-2006-0079784 A | 7/2006 |
| 2010/0177733 A1 | 7/2010 | Yi et al. | | KR | 10-2006-0090191 A | 8/2006 |
| 2010/0232335 A1 | 9/2010 | Lee et al. | | KR | 10-2007-0048552 | 5/2007 |
| 2010/0260140 A1 | 10/2010 | Zhu | | KR | 10-2007-0076374 | 7/2007 |
| 2011/0019604 A1 | 1/2011 | Chun et al. | | KR | 10-0907978 B1 | 7/2009 |
| 2011/0033048 A1 | 2/2011 | Stanwood et al. ............ 380/255 | | KR | 10-2009-0084756 A | 8/2009 |
| | | | | RU | 2 304 348 C2 | 1/2004 |
| FOREIGN PATENT DOCUMENTS | | | | RU | 2291594 C2 | 1/2007 |
| CN | 1396780 A | 2/2003 | | TW | 496058 B | 7/2002 |
| CN | 1549610 A | 11/2004 | | WO | 01/39386 A1 | 5/2001 |
| CN | 1613210 A | 5/2005 | | WO | WO 01/37473 A1 | 5/2001 |
| CN | 1642067 A | 7/2005 | | WO | 03/045103 A1 | 5/2003 |
| CN | 1761260 A | 4/2006 | | WO | 2004/042953 A1 | 5/2004 |
| CN | 1761356 A | 4/2006 | | WO | 2004/042963 A1 | 5/2004 |
| CN | 1846365 A | 10/2006 | | WO | WO 2004/042964 A1 | 5/2004 |
| CN | 1868157 A | 11/2006 | | WO | 2005/039108 A2 | 4/2005 |
| CN | 1918825 A | 2/2007 | | WO | 2005/078967 A1 | 8/2005 |
| CN | 1938969 A | 3/2007 | | WO | 2005079105 A1 | 8/2005 |
| CN | 1954521 A | 4/2007 | | WO | 2005/122441 A1 | 12/2005 |
| CN | 1997227 A | 7/2007 | | WO | 2005/125226 A2 | 12/2005 |
| CN | 101047966 A | 10/2007 | | WO | WO 2006/009714 A1 | 1/2006 |
| CN | 101090281 A | 12/2007 | | WO | WO 2006/016785 A1 | 2/2006 |
| EP | 1 796 405 A1 | 9/1985 | | WO | WO 2006/033521 A1 | 3/2006 |
| EP | 1263160 A1 | 12/2002 | | WO | 2006/046894 A1 | 5/2006 |
| EP | 1 343 267 A2 | 1/2003 | | WO | 2006/052086 A2 | 5/2006 |
| EP | 1 326 397 A2 | 7/2003 | | WO | WO 2006/083149 A1 | 8/2006 |
| EP | 1 343 267 A2 | 9/2003 | | WO | WO 2006/095385 A1 | 9/2006 |
| EP | 1 508 992 A2 | 2/2005 | | WO | WO 2006/104335 A2 | 10/2006 |
| EP | 1 509 011 A2 | 2/2005 | | WO | WO 2006/104342 A2 | 10/2006 |
| EP | 1638237 A2 | 3/2006 | | WO | 2006/118418 A2 | 11/2006 |
| EP | 1 689 130 A1 | 8/2006 | | WO | 2006116620 A2 | 11/2006 |
| EP | 1 746 855 A2 | 1/2007 | | WO | WO 2006/118435 A1 | 11/2006 |
| EP | 1 768 297 A2 | 3/2007 | | WO | WO 2007/020070 A2 | 2/2007 |
| EP | 2 026 523 A1 | 2/2009 | | WO | 2007/024065 A1 | 3/2007 |
| EP | 2 108 223 | 10/2009 | | WO | WO 2007/023364 A1 | 3/2007 |
| JP | 7-162948 A | 6/1995 | | WO | 2007/039023 A1 | 4/2007 |
| JP | 2000324161 A | 11/2000 | | WO | WO 2007/045505 A1 | 4/2007 |
| JP | 2001-197021 A | 7/2001 | | WO | 2007/052900 A1 | 5/2007 |
| JP | 2002-198895 | 7/2002 | | WO | WO 2007/052921 A1 | 5/2007 |
| JP | 2003018050 A | 1/2003 | | WO | 2007/066900 A1 | 6/2007 |
| JP | 2003-115876 A | 4/2003 | | WO | 2007/078142 A1 | 7/2007 |
| JP | 2003115796 A | 4/2003 | | WO | 2007-078156 A2 | 7/2007 |
| JP | 2003-229925 A | 8/2003 | | WO | 2007/078164 A1 | 7/2007 |
| JP | 2003283592 A | 10/2003 | | WO | 2007/078173 A1 | 7/2007 |
| JP | 2005-073276 A | 3/2005 | | WO | 2007/078174 A1 | 7/2007 |
| JP | 2006-505209 A | 2/2006 | | WO | WO 2007/079085 A2 | 7/2007 |
| JP | 2006054718 A | 2/2006 | | WO | 2007/089797 A2 | 8/2007 |
| JP | 2006514466 A | 4/2006 | | WO | 2007/091831 A2 | 8/2007 |

| | | | |
|---|---|---|---|
| WO | 2007/126793 A2 | 11/2007 | |
| WO | 2007/147431 A1 | 12/2007 | |
| WO | 2008/004725 A1 | 1/2008 | |
| WO | WO 2008/010063 A2 | 1/2008 | |
| WO | WO 2008/094120 A1 | 8/2008 | |
| WO | WO 2009/035301 A2 | 3/2009 | |

OTHER PUBLICATIONS

U.S. Appl. No. 60/976,139, Wang, et al.
U.S. Appl. No. 61/019,058, Sammour et al.
U.S. Office Action dated Oct. 28, 2011 (U.S. Appl. No. 12/452,495).
U.S. Office Action dated Nov. 4, 2011 (U.S. Appl. No. 12/234,574).
U.S. Office Action dated Nov. 9, 2011 (U.S. Appl. No. 12/452,733).
Taiwan Office Action dated Oct. 28, 2011 (Application No. 097123135 with translation).
U.S. Office Action dated Nov. 14, 2011 (U.S. Appl. No. 12/452,793).
U.S. Office Action dated Nov. 29, 2011 (U.S. Appl. No. 12/678,487).
Russian Office Action dated Dec. 2, 2011, with English translation.
U.S. Office Action (U.S. Appl. No. 12/672,999) dated Dec. 29, 2011.
U.S. Office Action (U.S. Appl. No. 12/699,022) dated Jan. 12, 2012.
3GPP TS 36.322 V8. 0. 0, Dec. 20, 2007, pp. 11-12, 20-30, URL segment and/or concatenate the RLC SDUs in accordance to the TB size selected by MAC at the particular transmission opportunity notified by MAC.
Meeting #61bis R2-081700, Mar. 31, 2008, URL, R2-081700.
Ericsson, Clarification to the handling of large RLC status reports, 3GPP TSG-RAN2 Meeting #61bis R2-082018, Mar. 31, 2008.
LG Electronics Inc., NTT DoCoMo, ACK_SN setting for short Status PDU, 3GPP TSG-RAN WG2 #62 R2-082133, May 5, 2008.
U.S. Office Action dated Feb. 24, 2012, for U.S. Appl. No. 12/665,324.
Taiwan Office Action dated Feb. 17, 2012.
3GPP TS 36.321, pp. 2-19.
3GPP TS 25.321, pp. 2-11.
3GPP TSG-RAN WG2 #59bis, pp. 1-5.
3GPP TSG-RAN2 Meeting #59bis, pp. 1-3.
3GPP TSG RAN WG2 #59bis, pp. 2-24.
U.S. Office Action dated Feb. 23, 2012, for U.S. Appl. No. 12/682,841.
U.S. Office Action dated Mar. 1, 2012, for U.S. Appl. No. 12/667,860.
United Kingdom Office Action dated Feb. 21, 2012, for Application No. GB1002893.4.
ASUSTek, "Summary of HFN de-synchronization problem off-line email discussion," 3GPP RSG RAN WG2 #46 Tdoc R2-050318, Feb. 2005. pp. 1-4.
ASUSTek, "On-line recovery of HFN synchronization due to RLC UM SN problem," 3GPP TSG-RAN WG2 Meeting #44 R2-041940, Oct. 2004. pp. 1-4.
Korean Office Action (Application No. 10-2009-0022158) dated Apr. 24, 2012, with English translation.
U.S. Appl. No. 12/212,546 Office Action dated May 13, 2011.
US Office Action dated Sep. 29, 2011 from related technology U.S. Appl. No. 12/673,004.
US Office Action dated Sep. 28, 2011 from related technology U.S. Appl. No. 12/452,592.
U.S. Office Action dated Feb. 3, 2012, for U.S. Appl. No. 12/363,007.
3GPP TSG-RAN WG1 #48bis, pp. 1-4.
3GPP TSG-RAN WG1 #49bis, pp. 1-5.
3GPP TSG-RAN WG2 #59bis, pp. 1-3.
3GPP TSG-RAN2 Meeting #59, pp. 1-103.
3GPP TSG-RAN WG2#58bis Meeting, *Optimized Buffer Status Reporting*, Jun. 25-29, 2007, pp. 1-6.
3GPP TSG RAN WG2#55, *Consideration on UL buffer reporting*, Oct. 13, 2006, pp. 1-2.
LG Electronics Inc., *UE state transition in LTE_ACTIVE*, 3GPP Draft, R2-061002, Mar. 23, 2006, pp. 1-3.
Texas Instruments, *UL Synchronization Management and Maintenance in E-UTRA*, Draft, R1-072198, May 1, 2007, pp. 1-7.
Texas Instruments, *UL Synchronization Management in LTE_ACTIVE*, R1-071478, Mar. 21, 2007, pp. 1-4.
Motorola, *Concentration-free Intra-LTE Handover*, 3GPP Draft, R2-070730, Feb. 9, 2007, pp. 1-3.
Ericsson, *Scheduling Request in E-UTRAN*, 3GPP Draft, R1-070471, Jan. 10, 2007, pp. 1-11.
Ghosh, A., et al., *Random Access Design for UMTS Air-Interface Evolution*, IEEE Xplore, Apr. 22-25, 2007, pp. 1041-1045.
U.S. Appl. No. 12/733,179, Office Action dated Mar. 4, 2011.
U.S. Appl. No. 12/406,677, Notice of Allowance dated Mar. 4, 2011.
Motorola, *Synchronized Random Access Channel and Scheduling Request*, 3GPP TSG RAN1#47, Nov. 6-10, 2006, pp. 1-3.
NTT DoCoMo, Funitsu, Mitsubishi Electric, NED, Sharp, Toshiba Corporation, *Scheduling Request Transmission Method for E-UTRA Uplink*, 3gPP TSG RAN WG1 Meeting #47, Nov. 6-10, 2006, pp. 1-6.
Ericsson, *Basic Principles for the Scheduling Request in LTE*, 3gPP TSG RAN WG2 #54, Aug. 28-Sep. 1, 2006, pp. 1-2.
Ericsson, Nokia Cororation, Nokia Siemens Networks, Qualcomm Europe, Samsung, NTT DoCoMo, Inc., *Framework for Scheduling Request and Buffer Status Reporting*, Nov. 5-9, 2007, pp. 1-4.
3GPP TSG-RAN WG2#59.
3GPP TSG-RAN-WG2 Meeting #58bis.
European Search Report (Application No. 11009737) dated Mar. 27, 2012.
U.S. Office Action (U.S. Appl. No. 12/672,835) dated Apr. 5, 2012.
U.S. Office Action (U.S. Appl. No. 12/451,795) dated Apr. 2, 2012.
U.S. Office Action (U.S. Appl. No. 12/671,020) dated Apr. 18, 2012.
Chinese Office Action (Application No. 200880107176.X) dated Apr. 13, 2012, with English translation.
U.S. Office Action (U.S. Appl. No. 12/672,999) dated May 1, 2012.
Cohen R Ed, "An improved SSCOP-like scheme for avoiding unnecessary retransmissions and achieving ideal throughput," Proceedings of IEEE INFOCOM. Conference on Computer Communications, Fifteenth Annual Joint Conference of the IEEE Computer and Communications Societies. Networking the Next Generation. San Francisco, Mar. 1996, vol. 2, XP010158150.
US Office Action dated Sep. 14, 2011 from related technology application U.S. Appl. No. 12/452,464.
US Office Action dated Sep. 14, 2011 from related technology application U.S. Appl. No. 12/452,183.
EP Office Action dated Aug. 31, 2011 from related technology application EP Application No. 08766509.
3GPP TSG-RAN WG2 Meeting #53, Shanghai, China, *Redundant retransmission restraint in RLC-AM*, Discussion, Decision, May 8-12, 2006, pp. 1-6.
GSM: Global System for Mobile Communications, *Digital cellular telecommunications system (Phase 2+); Functional stage 2 description of Location Services (LCS) in GERAN (3GPP TS 43.059 version 7.3.0 Release 7)*, May 2007, pp. 1-70.
Abeta, S., et al., *Super 3G Technology Trends Part 2: Research on Super 3G Technology*, NNT DoCoMo Tech Journal, vol. 8 No. 3, pp. 55-62.
Nokia, *System Information Distribution*, 3GPP TSG-RAN WG2 Ad Hoc Meeting on LTE, Jun. 27-30, 2006, pp. 1-3.
LG Electronics, *Delivery of LTE System Information*, 3GPP TSG-RAN WG2 Ad Hoc Meeting on LTE, Jun. 27-30, 2006, pp. 1-4.
U.S. Office Action (U.S. Appl. No. 12/602,763) dated May 11, 2012.
U.S. Appl. No. 12/817,819 Office Action dated Apr. 13, 2011.
U.S. Appl. No. 60/944,662, dated Jun. 18, 2007, inventor Tsyoshi Kashima.
U.S. Appl. No. 61/006,348 dated Jan. 8, 2008, inventors Li-Cheng Lin et al.
Office Action dated Jul. 13, 2011, for U.S. Appl. No. 12/363,007.
Office Action dated Jul. 14, 2011, for U.S. Appl. No. 12/143,607.
UALCOMM Europe, Further Details on RACH Procedure, 3GPP TSG-RAN WG1 #48, R1-070649, Jan. 12-16, 2007, entire document.
NTT DoCoMo, Inc. "BUFFER Status Report and Scheduling Request triggers," 3GPP TSG-RAN WG2 #59, R2-073574, Aug. 20-24, 2007, entire document.
LG Electronics Inc.: "Correction of status reporting coding", 3GPP TSG RAN WG2 61, R2-0809, Feb. 5, 2008, pp. 1-3, XP 002634626.
3rd Generation Partnership Project; Technical Specification Group Radio Access Network; Evolved Terrestial Radio Access (E-UTRA); Packet Data Convergence Protocol (PDCP) (Release 8), F-06921, XP050377638.

Alcatel-Lucent: "PDCP status report carrying LIS only", 3GPP Draft; R2-08902, 3RD Generation Partnership Project (3GPP), Mobile Competence Centre; 650, Route Des Lucioles; F-06921 Sophia-Antipolis Cedex; France, vol. RAN WG2, no, Sorrento, Italy: Feb. 4, 2008, XP050138711.
Correction to PDCP Status Report, 3GPP-TSG RAN WG2 61bis, R2-081594; Mar. 24, 2008), pp. 1-8, XP002624627.
Office Action dated Dec. 15, 2010 in related U.S. Appl. No. 12/452,433.
European Search Report (Application No. 09722068.5) dated May 24, 2012.
Universal Mobile Telecommunications System (UMTS); Radio Link Control (RLC) protocol specification (3GPP TS 25.322 version 4.10.0 Release 4); ETSI TS 125 322, XP014016803, Sep. 1, 2003.
LG Electronics Inc: Correction to Polling Procedure, 3GPP Draft; R2-081588 Correction to Polling Procedure, 3rd Generation Partnership Project (3GPP) XP050139320, Mar. 24, 2008.
Chinese Office Action (Application No. 200880102631.7), dated Jun. 20, 2012.
Chinese Office Action (Application No. 200980100119.3), dated Jun. 18, 2012.
TSG-RAN WG2 Meeting #60.
U.S. Office Action (U.S. Appl. No. 12/733,179), dated Oct. 31, 2012.
Chinese Office Action (Application No. 2008801163460), dated Jun. 20, 2012.
Chinese Office Action (Application No. 20088017173.6), dated Jul. 3, 2012.
3GPP TSG-RAN WG1 #47bis, Jan. 2007.
US Office Action (U.S. Appl. No. 12/673,741), dated Jul. 19, 2012.
U.S. Office Action (U.S. Appl. No. 12/677,945), dated Aug. 14, 2012.
U.S. Office Action (U.S. Appl. No. 12/668,199), dated Aug. 24, 2012.
Chinese Office Action (Application No. 200880107904.7), dated Jul. 30, 2012.
U.S. Final Office Action (U.S. Appl. No. 12/672,835), dated Aug. 30, 2012.
U.S. Notice of Allowance (U.S. Appl. No. 13/150,892), dated Aug. 24, 2012.
Chinese Office Action (Application No. 200880107676.3), dated Sep. 7, 2012, with English translation.
U.S. Office Action (U.S. Appl. No. 12/671,020), dated Oct. 3, 2012.
Alcatel-Lucent, Format for RACH Message 2, R2-080176, 3GPP Jan. 1, 2008.
Motorola, Design of backoff scheme for LTE, R2-070143, 3GPP, Jan. 19, 2007.
MAC Rapporteurs (Ericsson, Qualcomm Europe), E-UTRA MAC protocol specification update, R2-080631, 3GPP, Jan. 18, 2008.
LG Electronics, Update of eUtran PCDP specification, R2-081390, 3GPP Feb. 22, 2008.
U.S. Office Action (U.S. Appl. No. 12/738,625), dated Oct. 24, 2012.
U.S. Office Action (U.S. Appl. No. 12/682,841) dated Jun. 13, 2012.
U.S. Office Action (U.S. Appl. No. 12/452,733) dated Jun. 11, 2012.
Office Action dated Nov. 16, 2010 in related U.S. Appl. No. 12/733,179.
European Search Report (Application No. 08766423.1), dated Nov. 5, 2012.
NTT DoCoMo et al.: "Uplink synchronization maintenance," 3GPP Draft; R2-072014. 3rd Generation Partnership Project (3GPP), Mobile Competence Centre: May 4, 2007, XP050134889.
U.S. Office Action (U.S. Appl. No. 12/933,538), dated Nov. 23, 2012.
Chinese Office Action (Application No. 200980109358.5), dated Nov. 26, 2012.
U.S. Office Action (U.S. Appl. No. 12/452,905), dated Dec. 3, 2012.
European Search Report (Application No. 08011263), dated Dec. 7, 2012.
CATT: "Notification scheme for system information Change," 3 GPP DRAFT; R2-071870, 3rd. Generation Partnership Project (3GPP), vol. RAN WG2, No. Kobe, Japan; May 4, 2007, XP050134764.
LG Electronics Inc., "Discussion on BCCH Update," 3GPP DRAFT; R2-072736 Mechanism for BCCH Update, 3rd Generation Partnership Project (3GPP), vol. RAN WG2, No. Orlando, USA; Jun. 22, 2007, XP050135517.
U.S. Office Action for U.S. Appl. No. 12/452,733 dated Jan. 8, 2013.
Notice of Allowance—Issued for U.S. Appl. No. 13/107,232 on Jan. 30, 2013 by the United States Patent and Trademark Office.
U.S. Office Action (U.S. Appl. No. 12/671,020), dated Feb. 14, 2013.
Chinese Office Action (Application No. 200980100119.3), dated Feb. 5, 2013.

* cited by examiner

METHOD FOR REPAIRING AN ERROR DEPENDING ON A RADIO BEARER TYPE

The present application is a national stage of PCT International Application No. PCT/KR2008/006375, filed Oct. 29, 2008, and claims the benefit of U.S. Provisional Application No. 60/983,304, filed Oct. 29, 2007. The present national stage application also claims the benefit of Korean Patent Application No. 10-2008-0106298, filed Oct. 29, 2008.

TECHNICAL FIELD

The present invention relates to a wireless communication system, and more particularly, to a method of re-establishing a radio bearer in a wireless communication system.

BACKGROUND ART

In the modern advanced information society, importance of confidentiality and integrity between a user equipment and a network is being increased. To this end, according to the 3 generation project partnership (3GPP), a packet data convergence protocol (PDCP) layer performs a security function.

The security function has two kinds of functions, i.e., ciphering and integrity protection. A code varied depending on each packet is generated by these two functions, and ciphering and integrity check are performed for original data using the generated code.

The code varied depending on each packet is generated using a PDCP sequence number (SN) and added to each PDCP PDU header. For example, the code varied depending on each packet is generated using COUNT which includes PDCP SN. The COUNT has a length of 32 bits, of which the least significant bit (LSB) has a PDCP SN and the most significant bit (MSB) has a hyper frame number (HFN). The PDCP SN has a length of 5 bits, 7 bits, or 12 bits depending on a radio bearer (RB). Accordingly, the HFN has a length of 27 bits, 25 bits or 20 bits.

FIG. 1 is a diagram illustrating an example of a method of performing ciphering in a PDCP layer. A PDCP layer of a transmitting side generates ciphered data by covering original data with a MASK. The MASK is a code varied for each of the aforementioned packets. Covering original data with a MASK means that XOR operation for each bit is performed for the original data with respect to MASK. A PDCP layer of a receiving side, which has received the ciphered data, deciphers the original data by again covering the original data with a MASK. The MASK has 32 bits and is generated from several input parameters. In particular, in order to generate different values for respective packets, COUNT is generated using PDCP SN varied depending on PDCP PDU. The COUNT is used as one of MASK generation input parameters. In addition to the COUNT, examples of the MASK generation input parameters include ID value (bearer of FIG. 1) of a corresponding RB, Direction having an uplink or downlink value, and a ciphering key (CK) exchanged between a user equipment and a network during RB establishment.

FIG. 2 is a diagram illustrating an example of a method of performing integrity protection in a PDCP layer. Similarly to the aforementioned ciphering procedure, in an integrity protection procedure, parameters, such as COUNT based on PDCP SN, bearer which is ID value of RB, Direction having an uplink or downlink value, and integrity protection key (IK) exchanged between a user equipment and a network during RB establishment, are used. A specific code, i.e., MAC-I (Message Authentication Code-Integrity) is generated using the above parameters. The integrity protection procedure is different from the aforementioned ciphering procedure in that the generated MAC-I is added to PDCP PDU not undergoing XOR operation with original data. The PDCP layer of the receiving side, which has received the MAC-I, generates XMAC-I using the same input parameter as that used in the PDCP layer of the transmitting side. Afterwards, XMAC-I is compared with MAC-I, and if two values are equal to each other, it is determined that the data have integrity. If not so, it is determined that the data have been changed.

If a security error occurs for some reason, since the receiving side cannot recover the original data even if it receives the data from the transmitting side, the received data continue to come into disuse. RB of a user plane (i.e., data RB: DRB) performs header compression after deciphering the received PDCP PDUs. At this time, if deciphering is performed using a wrong MASK, error continues to occur during header decompression, whereby the received PDCP PDUs continue to come into disuse. RB of a control plane (i.e., signaling RB: SRB) performs integrity verification after deciphering the received PDCP PDUs. At this time, if deciphering is performed using a wrong MASK or comparison is performed using a wrong XMAC-I, error continues to occur during integrity verification, whereby the received PDCP PDUs continue to come into disuse.

Accordingly, if a security error occurs, the user equipment and/or the network regards it as a serious problem and thus re-establishes RRC connection between them and re-establishes security. If RRC connection is re-established, all SRBs and all DRBs are also re-established.

DETAILED DESCRIPTION OF THE INVENTION

Technical Problems

According to the related art, if an error occurs in one RB, all RBs are reestablished in such a manner that RRC connection is re-established. However, if an error occurs due to a problem limited to a specific RB, it is sufficient to solve the error for the specific RB. In this case, if RRC connection is re-established to solve the error of the specific RB, other RBs are re-established unnecessarily. For this reason, service quality may be deteriorated.

For example, security error may occur as an input parameter used for a security algorithm in a transmitting side is not identical with that in a receiving side. A hyper frame number (HFN), which is one of input parameters, may be varied depending on the transmitting side and the receiving side. This error occurs in a corresponding RB if a large number of PDCP SDUs (service data units) are damaged. This is because that HFN corresponding to the MSB of COUNT increases by one if the PDCP SN corresponding to the LSB of COUNT returns to 0 after reaching a maximum value. That is, if the PDCP SDU is damaged within the range that a PDCP SN is a wrap-around, HFN de-synchronization occurs. Also, when an error occurs in a lower layer, wherein the error is not found even by a cyclic redundancy code (CRC) check, HFN de-synchronization may occur if PDCP SN value exceeds an effective range.

Accordingly, the present invention is directed to a method of re-establishing a radio bearer in a wireless communication system, which substantially obviates one or more problems due to limitations and disadvantages of the related art.

An object of the present invention is to provide a method of ensuring quality of service (QoS) in a wireless communication system and using radio resources efficiently.

Another object of the present invention is to provide a method of efficiently repairing an error occurring in a radio bearer.

Still another object of the present invention is to provide a method of performing communication between a user equipment and a network to repair an error of a radio bearer.

Further still another object of the present invention is to provide a communication method of re-synchronizing de-synchronized specific parameters of a radio bearer.

It is to be understood that the technical solutions to be achieved by the present invention will not be limited to the aforementioned description, and another technical solutions, which are not described, will be apparent to those skilled in the art to which the present invention pertains, from the following detailed description of the present invention.

Technical Solutions

In one aspect of the present invention, a method of re-establishing a radio bearer of a user equipment in a wireless communication system comprises establishing a radio bearer; identifying whether an error has occurred in the radio bearer; and selectively re-establishing the radio bearer or all radio bearers of the user equipment in accordance with a type of the radio bearer if the error has occurred in the radio bearer.

Advantageous Effects

According to the embodiments of the present invention, the following advantages can be obtained.

First, it is possible to ensure quality of service (QoS) in the wireless communication system and efficiently use radio resources.

Second, it is possible to efficiently repair an error occurred in a radio bearer.

Third, it is possible to provide a communication procedure between a user equipment and a network for repairing an error of a radio bearer.

Finally, it is possible to re-synchronize de-synchronized specific parameters of a radio bearer.

It is to be understood that the effects that can be obtained by the present invention are not limited to the aforementioned effects, and another effects, which are not described, will be apparent to those skilled in the art to which the present invention pertains, from the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 3:
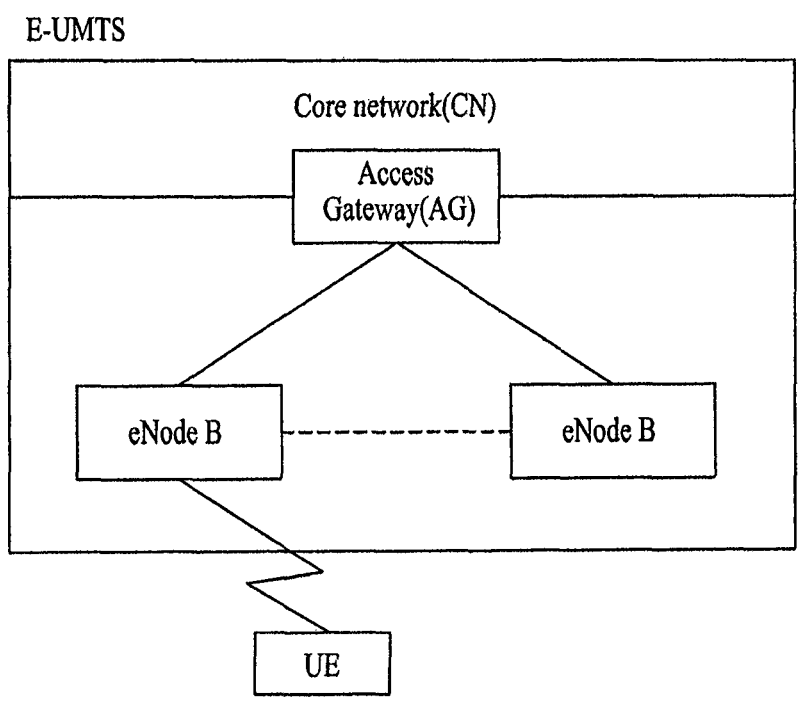
FIG. 3 is a diagram illustrating a network structure of an E-UMTS (Evolved Universal Mobile Telecommunications System)

FIG. 3 is a diagram illustrating a network structure of UMTS to which the embodiment of the present invention is applied. An E-UMTS is a system evolving from the conventional WCDMA (Wideband Code Division Multiple Access) UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information of technical specification about the UMTS and the E-UMTS.

Referring to FIG. 3, the E-UMTS includes a user equipment (UE), a base station, and an access gate (AG) located at the end of the E-UTRAN and connected with an external network. Generally, the base station can simultaneously transmit multi-data streams for broadcast service, multicast service, and/or unicast service. The AG may be divided into a user traffic processing part and a control traffic processing part. At this time, the AG for processing user traffic and the AG for processing control traffic can communicate with each other using a new interface. One or more cells exist in one eNB. An interface for transmitting user traffic or control traffic can be used between eNBs. A core network (CN) can include an AG and a network node for user subscription of a user equipment (UE0. An interface for identifying E-UTRAN from CN can be used. The AG manages mobility of a user equipment in a unit of tracking area (TA). The TA includes a plurality of cells. If the user equipment moves from a specific TA to another TA, the user equipment notifies the AG that the TA where the user equipment is located has been changed.

Figure 4:
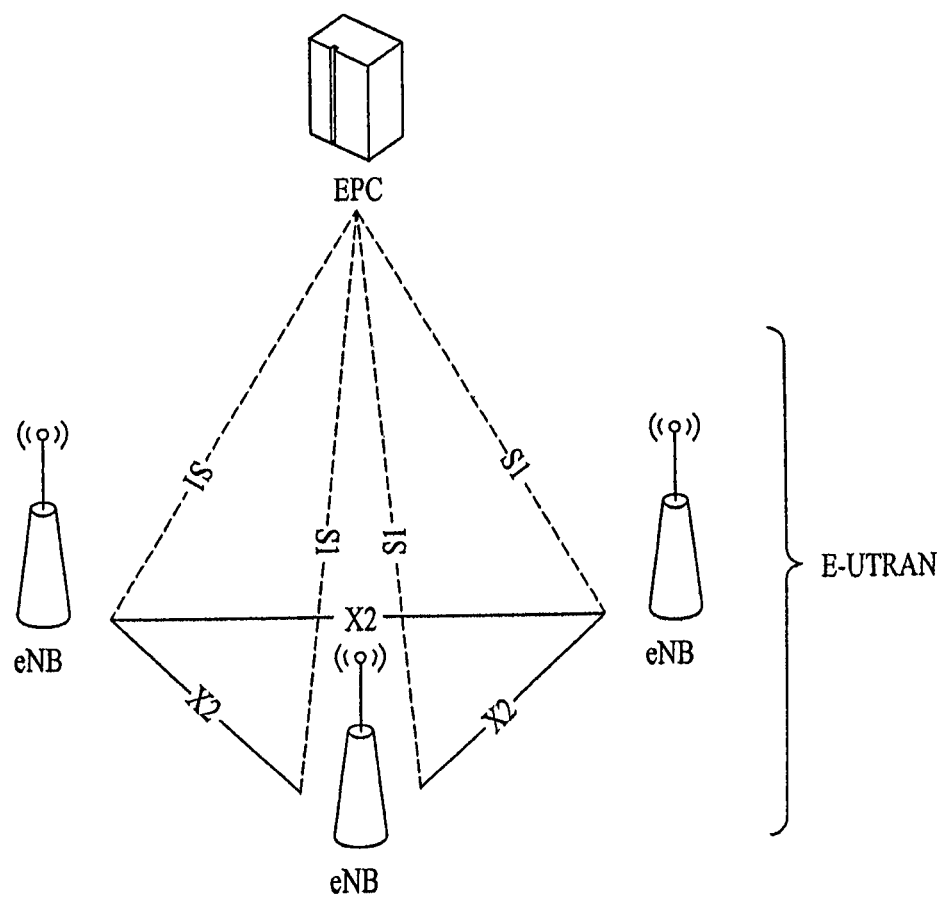
FIG. 4 is a schematic view illustrating an E-UTRAN (Evolved Universal Terrestrial Radio Access Network)

FIG. 4 is a schematic view illustrating a mobile communication system, i.e., an E-UTRAN (UMTS terrestrial radio access network) to which the embodiment of the present invention is applied. The E-UTRAN system is a system evolving from the existing UTRAN system. The E-UTRAN includes base stations eNBs, which are connected with each other through X2 interface. The eNB is connected with the user equipment through a radio interface, and is connected with an evolved packet core (EPC) through S1 interface.

Figure 5A:
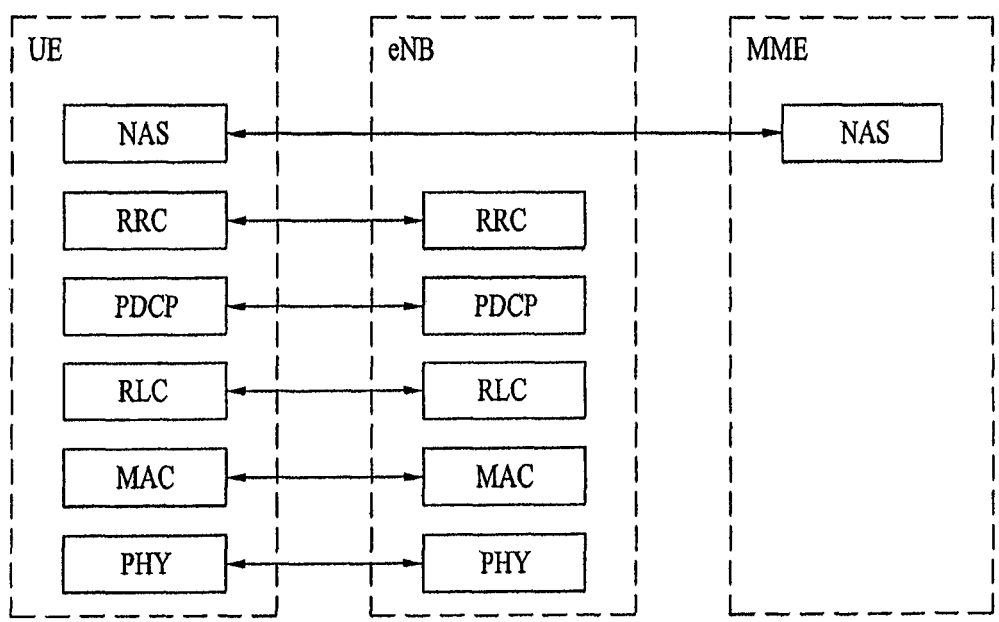
FIG. 5A and FIG. 5B are schematic views illustrating a control plane and a user plane of a radio interface protocol between a user equipment (UE) and E-UTRAN.
Figure 5B:
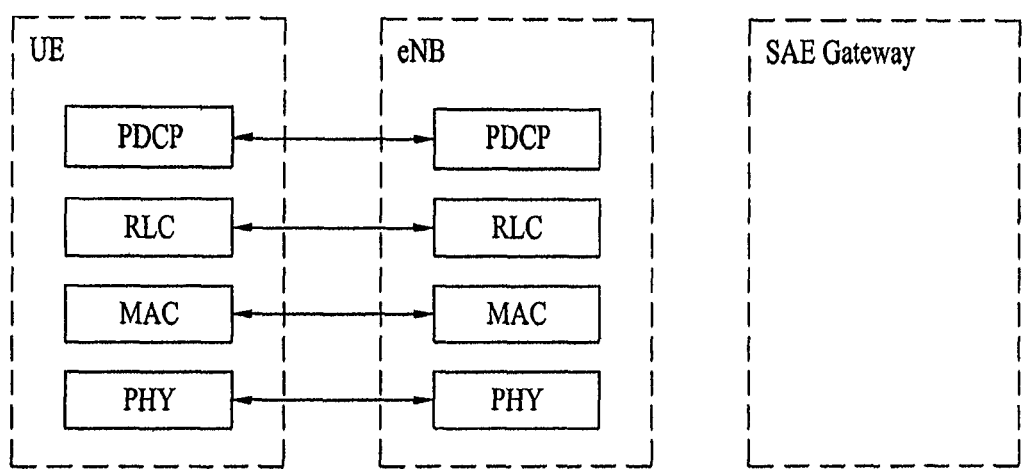

FIG. 5A and FIG. 5B illustrate structures of a control plane and a user plane of a radio interface protocol between a user equipment and UTRAN (UMTS Terrestrial Radio Access Network) based on the 3GPP radio access network standard. The radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

The physical layer as the first layer provides an information transfer service to an upper layer using a physical channel. The physical layer (PHY) is connected to a medium access control (hereinafter, abbreviated as 'MAC') layer above the physical layer via a transport channel. Data are transferred between the medium access control layer and the physical layer via the transport channel. The transport channel is divided into a dedicated transport channel and a common transport channel depending on channel sharing. Also, data are transferred between different physical layers, and more particularly, between one physical layer of a transmitting side and the other physical layer of a receiving side via the physical channel. The physical channel of the E-UMTS is modulated in accordance with an orthogonal frequency division multiplexing (OFDM) scheme, and uses time and frequency as radio resources.

Several layers exist in the second layer. The second layer will be illustrated in FIG. 6A and FIG. 6B in more detail. First of all, a medium access control (MAC) layer of the second layer serves to map various logical channels with various transport channels. Also, the MAC layer performs multiplexing for mapping several logical channels with one transport channel. The MAC layer is connected with RLC layer corresponding to its upper layer through the logical channel. The logical channel is divided into a control channel and a traffic channel depending on types of transmitted information, wherein the control channel transmits information of the control plane and the traffic channel transmits information of the user plane.

The RLC layer of the second layer serves to perform segmentation and concatenation of data received from its upper layer to control a size of the data so that the lower layer transmits the data to a radio period. Also, the RLC layer of the second layer provides three action modes, i.e., a transparent mode (TM), an unacknowledged mode (UM), and an acknowledged mode (AM) to ensure various quality of services (QoS) required by each radio bearer (RB). In particular, the AM RLC layer performs a retransmission function through automatic repeat and request (ARQ) for reliable data transmission.

In order to effectively transmit data using IP packets (e.g., IPv4 or IPv6) within a radio-communication period having a narrow bandwidth, a PDCP (packet data convergence protocol) layer of the second layer (L2) performs header compression to reduce the size of IP packet header having relatively great size and unnecessary control information. The header compression is to increase transmission efficiency of the radio-communication period by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (hereinafter, abbreviated as 'RRC') layer located on a lowest part of the third layer is defined in the control plane only and is associated with configuration, re-configuration and release of radio bearers (hereinafter, abbreviated as 'RBs') to be in charge of controlling the logical, transport and physical channels. To this end, the RRC layer allows the user equipment and the network to exchange RRC message with each other. If the RRC layer of the user equipment is RRC connected with the RRC layer of the radio network, the user equipment is in RRC connected mode. If not so, the user equipment is in RRC idle mode.

Figure 6A:
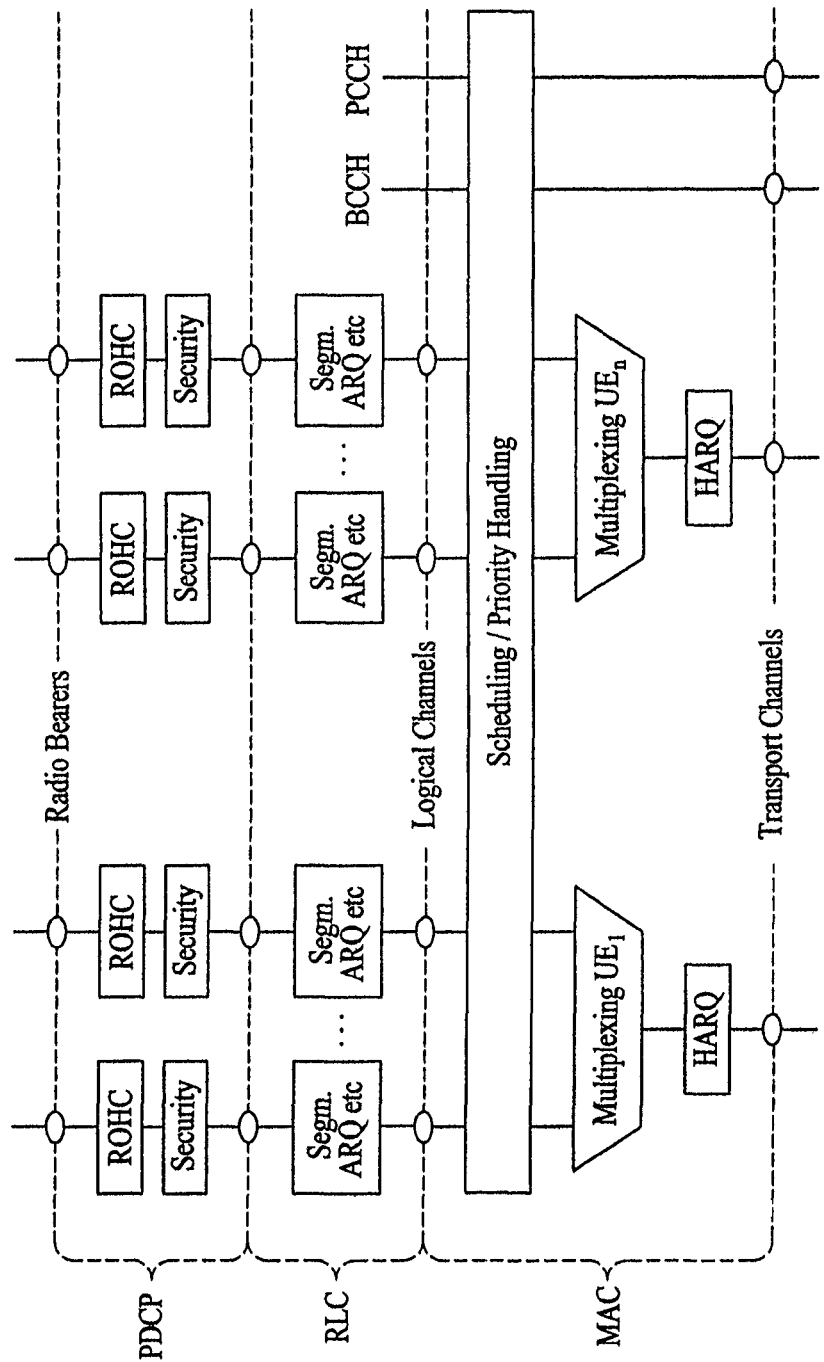
FIG. 6A and FIG. 6B are diagrams illustrating structures of second layers for a downlink and an uplink.
Figure 6B:
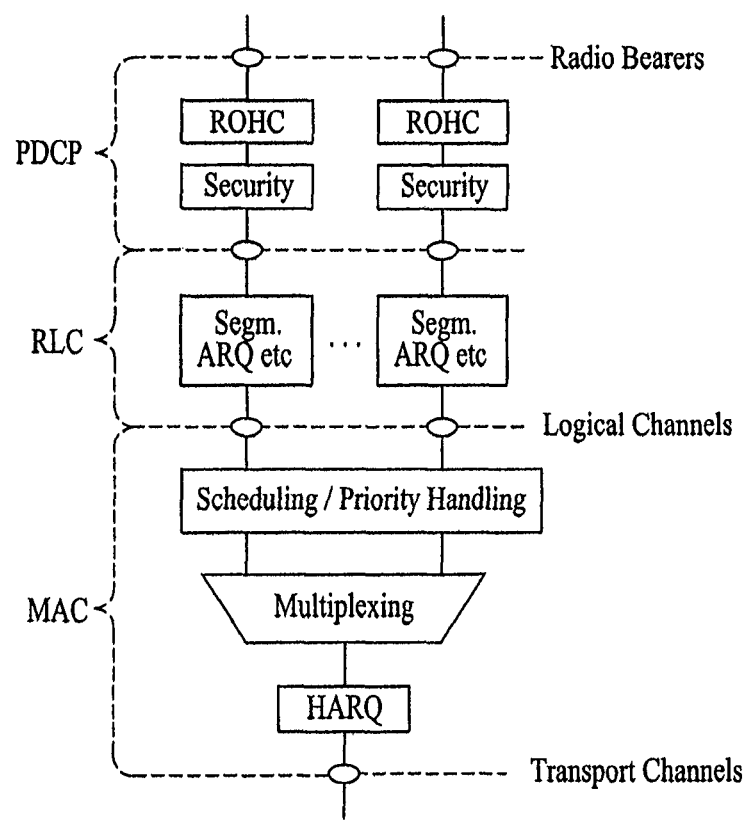

In this case, the RB means a service or logical path provided by the second layer for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a path for transmitting RRC message in a control plane, and the DRB is used as a path for transmitting user data in a user plane. Referring to FIG. 6A and FIG. 6B, RBs are illustrated at the upper end of a PDCP entity existing in a plurality logical paths allocated to respective users.

A non-access stratum (NAS) layer located above the RRC layer performs functions such as session management and mobility management.

One cell constituting eNB is established at one of bandwidths of 1.25, 2.5, 5, 10, and 20 Mhz and provides a downlink or uplink transmission service to several user equipments. At this time, different cells can be established to provide different bandwidths.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Hereinafter, the PDCP layer will be described in detail. The PDCP layer is upwardly connected with the RRC layer or user application and downwardly connected with the RLC layer.

Figure 7:
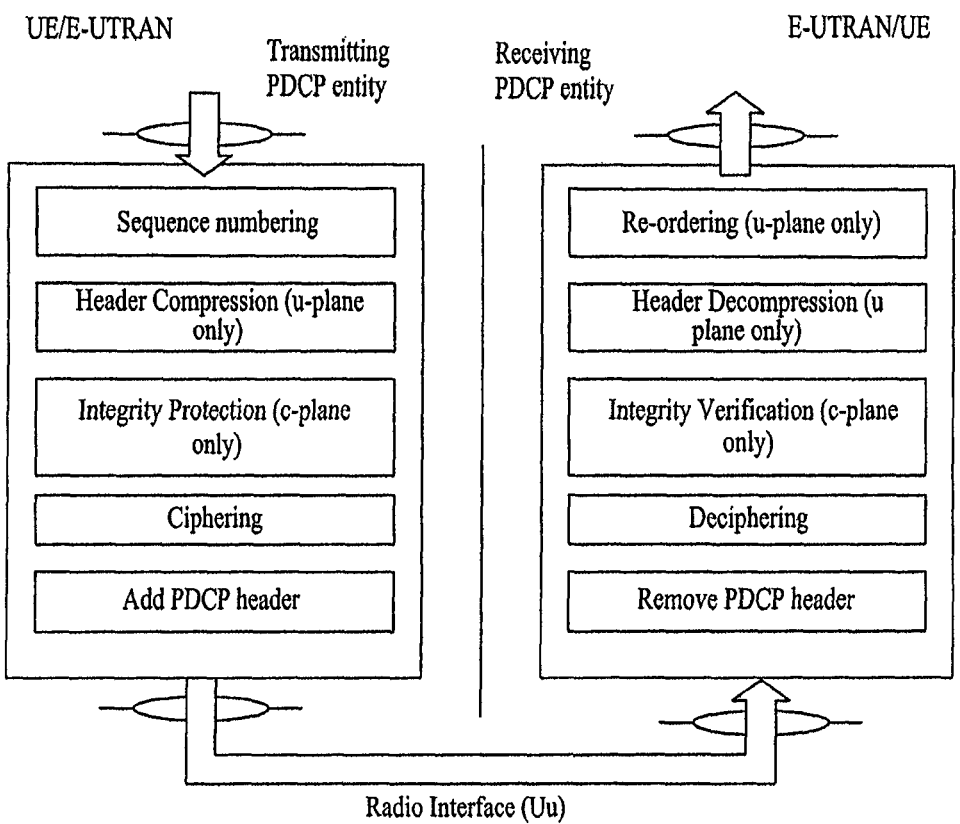
FIG. 7 is a diagram illustrating a functional structure of a PDCP layer.

FIG. 7 is a functional block diagram illustrating a transmitting side and a receiving side of the PDCP layer. In FIG. 7, the transmitting side located at the left illustrates that the PDCP layer is applied to PDCP SDU received from the upper entity. Also, the receiving side located at the right illustrates that the PDCP layer is applied to the PDCP PDU when the PDCP layer receives PDCP PDU from the lower entity.

The PDCP layer is used for both the user plane and the control plane. Some functions of the PDCP layer are selectively applied depending on the plane which is used. Namely, as illustrated in FIG. 7, the header compression function is applied to the user plane data only, and the integrity protection function is applied to the control plane data only.

The data processing procedure performed by the PDCP layer of the transmitting side will be described as follows.

1. The PDCP layer of the transmitting side receives PDCP SDUs and stores the received PDCP SDUs in a transmission buffer. Then, the PDCP layer allocates a sequence number to each PDCP SDU.
2. If the established RB is that of the user plane, i.e., DRB, the PDCP layer performs header compression for the PDCP SDUs.
3. If the established RB is that of the control plane, i.e., SRB, the PDCP layer performs integrity protection for the PDCP SDUs.
4. A data block generated by the result of the procedure 2 or 3 is ciphered.
5. The PDCP layer fixes a proper header to the ciphered data block to constitute PDCP PDU, and then transfers the constituted PDCP PDU to the RLC layer.

The data processing procedure performed by the PDCP layer of the receiving side will be described as follows.

1. The PDCP layer of the receiving side removes a header from the received PDCP PDU.
2. The PDCP layer deciphers the PDCP PDU from which the header has been removed.
3. If the established RB is that of the user plane, i.e., DRB, the PDCP layer performs header decompression for the deciphered PDCP PDU.
4. If the established RB is that of the control plane, i.e., SRB, the PDCP layer performs integrity verification for the deciphered PDCP PDU.
5. A data block (i.e., PDCP SDU) generated by the result of the procedure 3 or 4 is transferred to the upper layer. If the established RB is that of the user plane, i.e., DRB, the PDCP layer stores the data block in a receiving buffer as occasion demands and performs reordering for the data block. Then, the PDCP layer transfers the resultant data to the upper layer.

Next, header compression performed by the PDCP layer will be described. Header compression is to reduce a header size using the fact that most of fields of IP header remain unchanged in IP packets belonging to a single packet stream. The fields which remain unchanged are stored in a compressor of the transmitting side and a decompressor of the receiving side in a type of context. After the context is formed, the PDCP layer transmits changed fields only to reduce overhead of the IP header. At the initial step of header compression, since the compressor transmits full header packets to form the context for the corresponding packet stream in the decompressor, there is no gain due to header compression. However, after the context is formed in the decompressor, since the compressor transmits compressed header packets only, gain remarkably occurs.

Robust header compression (ROHC) which is a representative header compression scheme used in the LTE system is used to reduce header information of real-time packets such as real-time transport protocol (RTP)/user datagram protocol (UDP)/Internet protocol (IP). The RTP/UDP/IP packets mean that headers related to RTP, UDP and IP are fixed to data transferred from the upper layer. A header of the RTP/UDP/IP packets includes various kinds of information required for data to be transferred to a destination through Internet and decompressed there. Generally, the header of the RTP/UDP/IP packets has a size of 40 bytes in case of IPv4 (IP version 4) and 60 bytes in case of IPv6 (IP version 6). If the header of the RTP/UDP/IP packets is compressed using the ROHC, since the header of 40 or 60 bytes is reduced to 1~3 bytes, it is noted that gain remarkably occurs.

Figure 8:
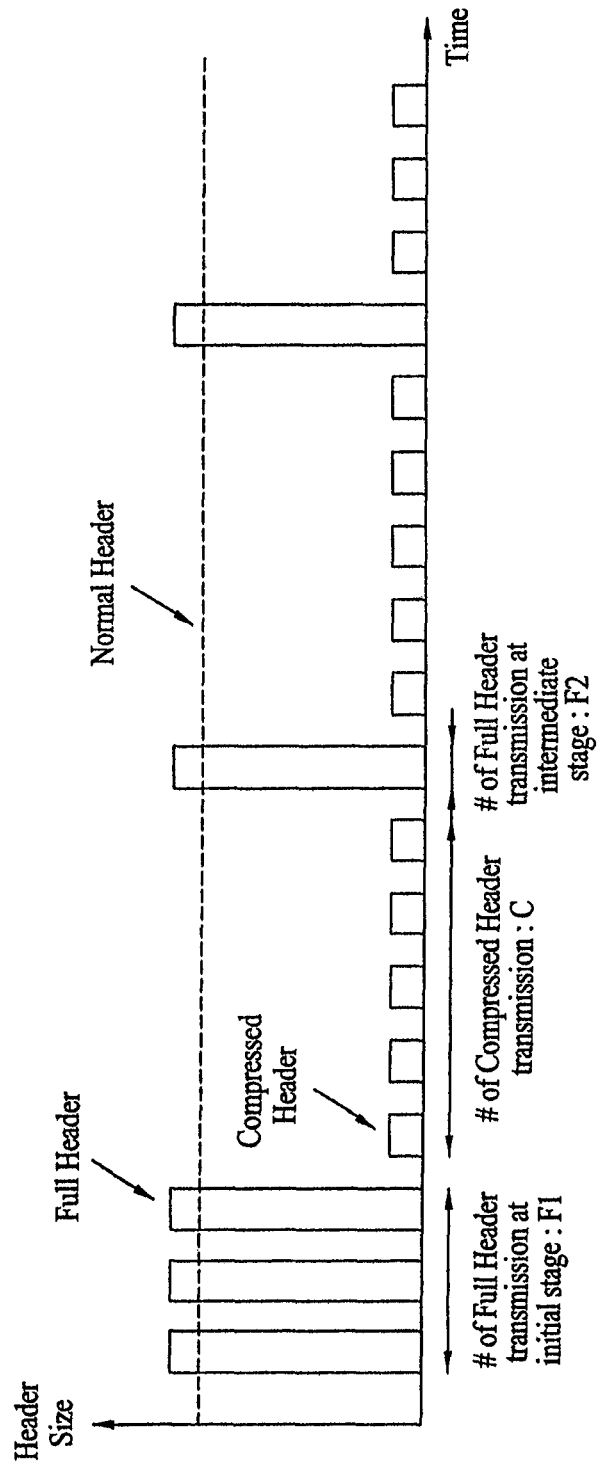
FIG. 8 is a diagram illustrating variation in a header size of a packet according to header compression in a PDCP layer.

FIG. 8 is a diagram illustrating variation in a header size of the RTP/UDP/IP packet according to ROHC header compression in the PDCP layer. Referring to FIG. 8, since contexts are not formed in both the compressor and the decompressor when packet streams are transmitted, the PDCP layer transmits a full header to form contexts. Since contexts are formed as the full header is transmitted, the PDCP layer can transmit a compressed header. However, since contexts may be damaged due to loss of packets, it is necessary to transmit the full header at a proper interval. Since the full header generally includes additional information of formation of contexts, the full header is a little greater than a normal header.

Embodiment: Error Repair Considering RB Type

The present invention suggests a method of repairing an error by selectively re-establishing all RBs or a corresponding RB in accordance with a feature of a specific RB not all RBs of the user equipment when the error occurs due to a problem limited to the specific RB. Preferably, the error is a security error.

Figure 9:
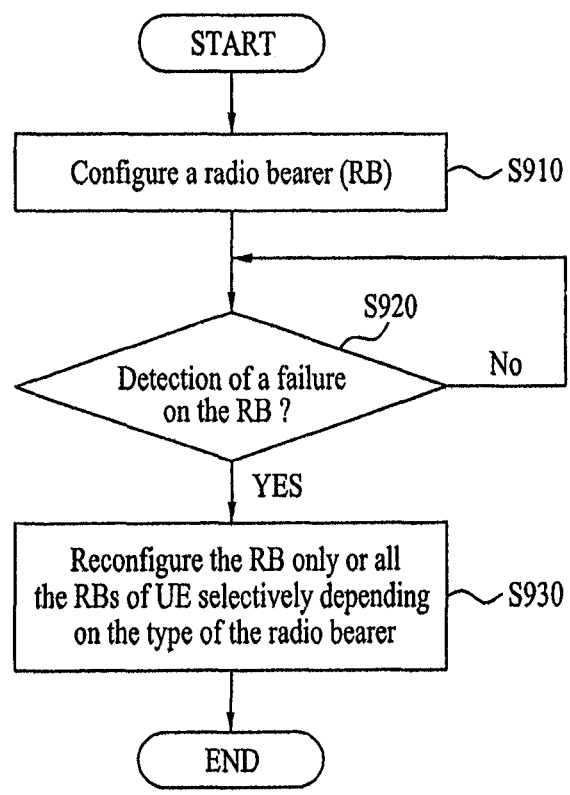
FIG. 9 is a flow chart illustrating an example of a method of repairing an error of a radio bearer in accordance with one embodiment of the present invention.

FIG. 9 is a flow chart illustrating an example of a method of repairing an error of a radio bearer in accordance with one embodiment of the present invention. Referring to FIG. 9, if RRC connection is established, the user equipment or the network establishes RB as occasion demands (S910). The RB is established by the third layer, i.e., RRC layer, may be DRB or SRB depending on the user plane or the control plane. The RB may be established initially between the user equipment and the network, or may newly be established in a state that several RBs have already been established. Afterwards, the user equipment or the network identifies whether an error has occurred in the RB established in the step S910 (S920). If the error is not identified, the step S920 continues to be repeated. If it is identified that the error has occurred in the RB established in the step S910, the RB is only re-established or all RBs established between the user equipment and the network are re-established depending on the type of the RB (S930).

Figure 10:
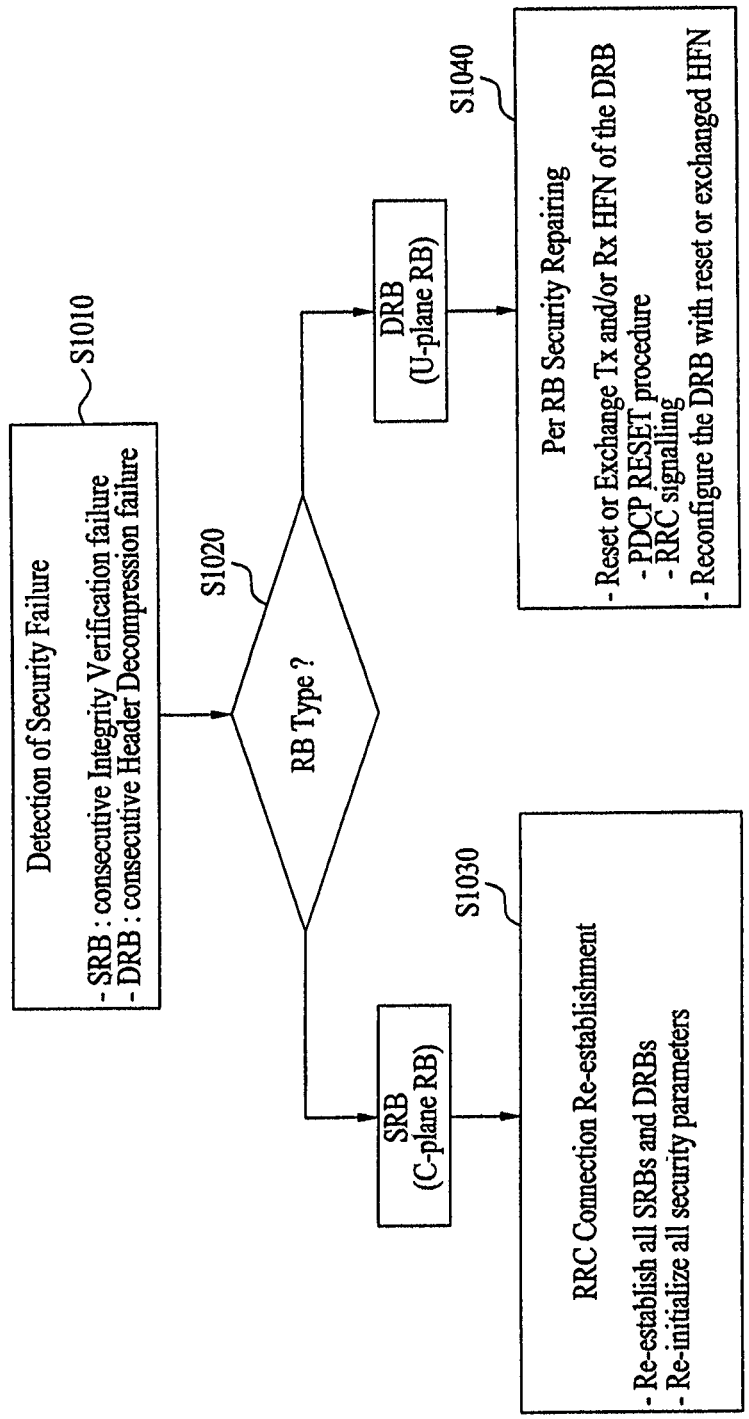
FIG. 10 is a detailed flow chart illustrating the flow chart of FIG. 9.

FIG. 10 illustrates the example of a method of repairing an error of a radio bearer in accordance with the embodiment of the present invention in more detail in respect of the steps S920 and S930 of FIG. 9.

Referring to FIG. 10, the user equipment or the network continues to identify whether an error has occurred in the established RB (S1010). The method of identifying that an error has occurred in the RB is not limited especially. For example, whether an error has occurred in the RB can be identified depending on the type of RB as following. In case of SRB, if a predetermined number of packet data are continuously failed in integrity verification of PDCP, the error may be regarded as security failure. Similarly, in case of DRB, if a predetermined number of packet data are continuously failed in header compression of PDCP, the error may be regarded as security failure. The predetermined number of packet data can be designated by the upper layer or the network.

The PDCP layer of the receiving side identifies that the security error has occurred in the RB if the above condition is satisfied, and then can notify the PDCP layer of the transmitting side that the security error has occurred. Afterwards, if necessary, the PDCP layer of the transmitting side can notify the upper layer, i.e., the RRC layer that the security error has occurred. Since the RRC layer of the transmitting side knows establishment information of all RBs, the RRC layer can identify whether the security error has occurred in what RB, based on notification from the PDCP layer. Also, if the PDCP layer of the receiving side identifies that the security error has occurred in the RB, this PDCP layer can notify the RRC layer of the receiving side that the security error has occurred in the RB. Since the RRC layer of the receiving side also knows establishment information of all RBs in respect of the transmitting side, this RRC layer can identify whether the security error has occurred in what RB, based on notification from the PDCP layer. Afterwards, the RRC layer of the receiving side can notify the RRC layer of the transmitting side, through RRC message, that the security error has occurred in a specific RB. In this case, the transmitting side/receiving side could be a user equipment/network or a network/user equipment depending on a data transmission direction.

If the security error has occurred in the RB, the user equipment or the network identifies the type of RB where the security error has occurred (S1020). Namely, the user equipment or the network identifies that the RB is SRB or DRB. According to the embodiment of the present invention, the security error is repaired depending on the type of the RB, i.e. SRB and DRB. Namely, the method of repairing the error in case of SRB is different from the method of repairing the error in case of DRB. The methods of repairing the error will be described later in steps S1030 and S1040. The reason why the security error is repaired depending on each of SRB and DRB is that the SRB is more important than the DRB in view of security. In other words, since the SRB is a passage where RRC message which controls the user equipment is exchanged between the user equipment and the network, if an error has occurred in the SRB, RRC connection between the user equipment and the network cannot be relied upon. Accordingly, it is safer in view of security to newly re-establish RRC connection. However, if the security error occurs in the DRB, it would be more efficient to repair the security error of a corresponding RB except for the other RBs in view of service.

If it is identified that the security error has occurred in the SRB, all RBs of the user equipment are re-established (S1030). For example, the user equipment or the network can re-establish all RBs of the user equipment by re-establishing RRC connection. Namely, the user equipment or the network re-establishes RRC connection after releasing the RRC connection. In this case, all RBs of the user equipment are re-established. Also, security parameters are all newly re-established so that they are applied to all RBs.

On the other hand, if it is identified that the security error has occurred in the DRB, security error repair is performed for the specific DRB (S1040). For example, the user equipment or the network can re-establish the DRB only. For another example, the user equipment or the network can repair the security error by synchronizing desynchronized parameter values associated with the security error with each other. Herein, de-synchronization means that the parameter values of the transmitting side and the receiving side become different from each other. Also, synchronization means that that the desynchronized parameter values of the transmitting side and the receiving side become consistent with a specific value.

Figure 1:
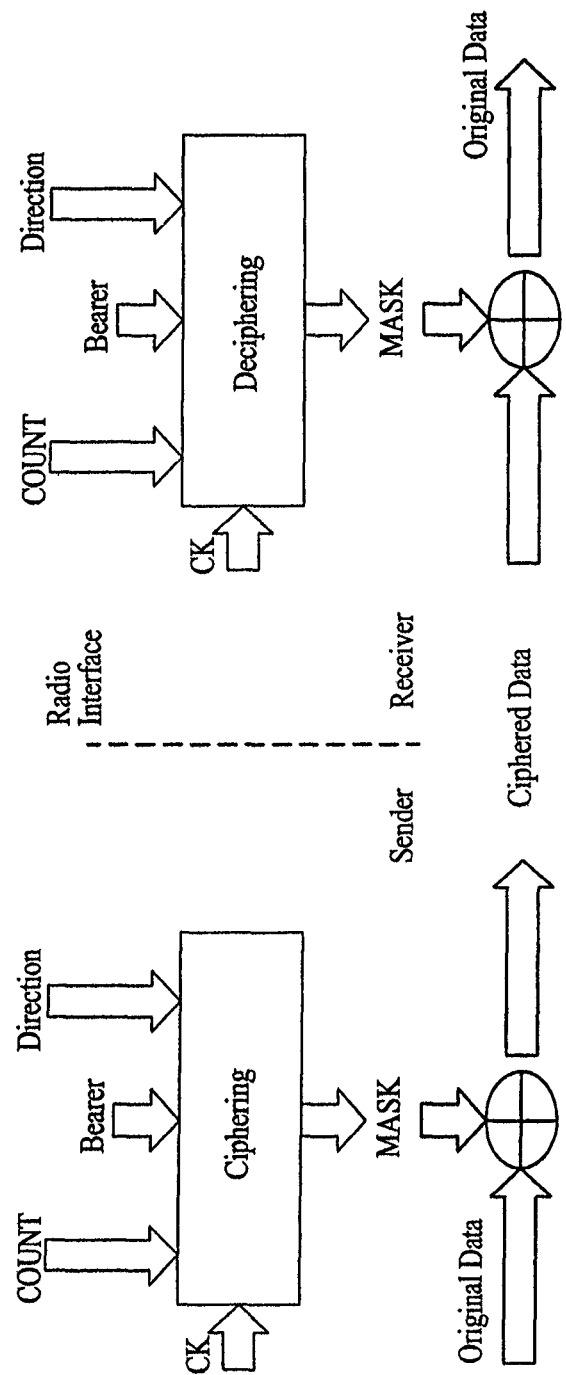
FIG. 1 is a diagram illustrating an example of a method of applying a ciphering function of security functions performed in a PDCP layer to a packet.
Figure 2:
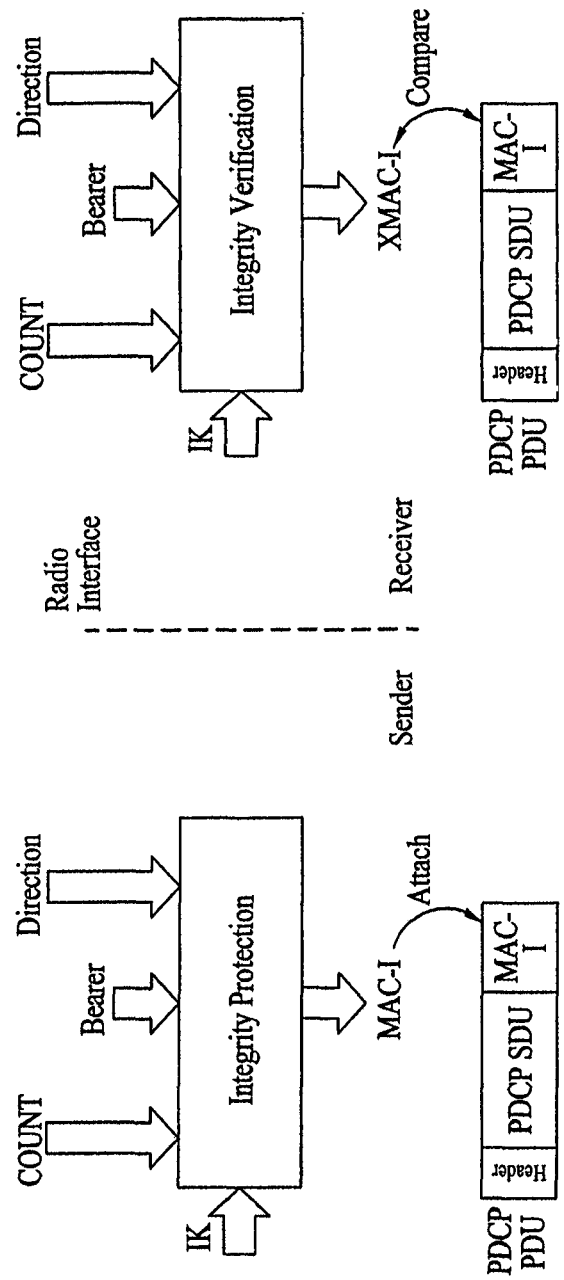
FIG. 2 is a diagram illustrating an example of a method of applying an integrity function of security functions performed in a PDCP layer to a packet.

Examples of the parameter values associated with the security error include, as illustrated in FIG. 1 and FIG. 2, CK (ciphering key), IK (integrity protection key), COUNT (i.e., HFN+PDCP SN), bearer (i.e., RB ID), and Direction. If there is difference in any one of the above parameter values between the transmitting side and the receiving side, the security error occurs. For example, if COUNT (i.e., HFN+PDCP SN) is desynchronized, the user equipment and the network synchronize the desynchronized COUNT (i.e., HFN+PDCP SN). Since the COUNT includes HFN and PDCP SN and the PDCP SN is included in a header of packet data, synchronizing the COUNT means synchronizing HFN.

Synchronizing the desynchronized parameter values is not limited to a specific example. For example, if a security error occurs in respect of a specific DRB, the user equipment and the network notify each other that the security error has occurred, and reset the desynchronized parameter values to a specific value which is previously determined or exchange any one parameter value with another one to re-configure another parameter value. The above procedure has been exemplarily illustrated in FIG. 11 to FIG. 13. Although HFN has illustrated as the desynchronized parameter, another parameter may be used.

Figure 11:
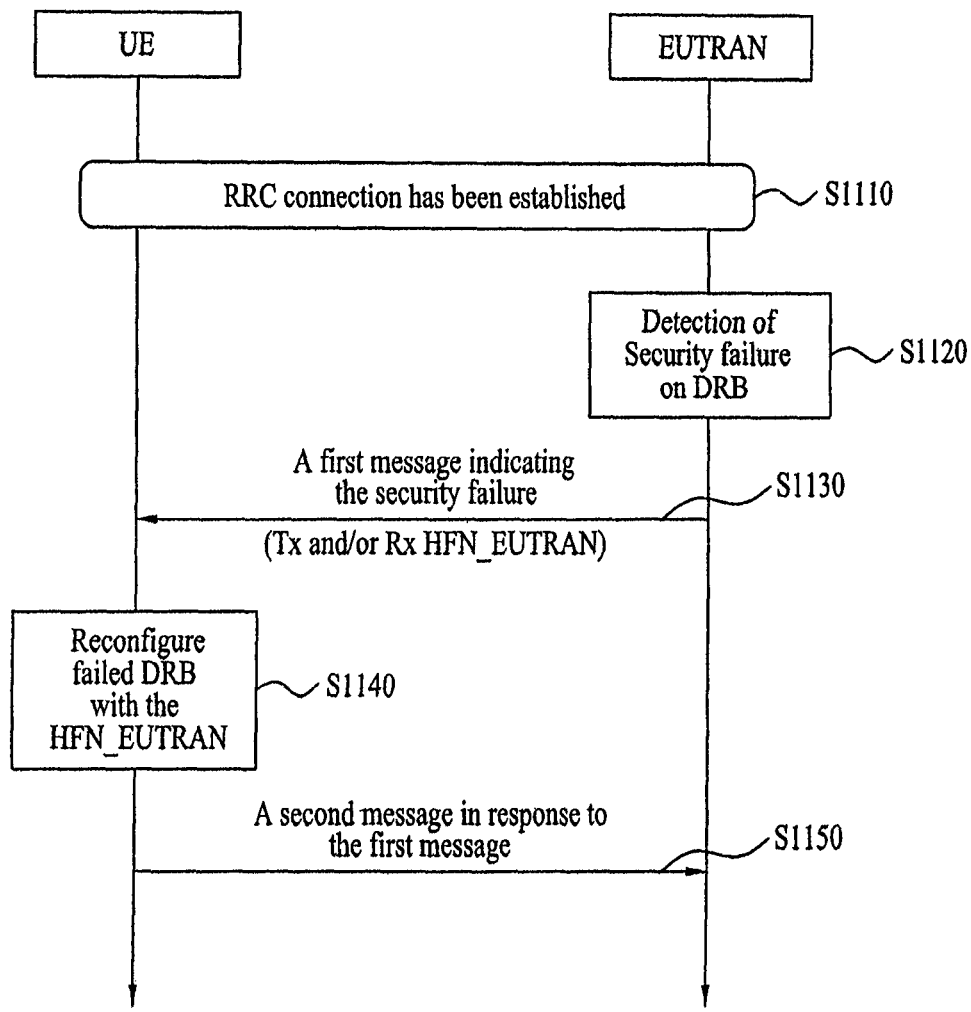
FIG. 11 is a diagram illustrating an example of a method of repairing a security error of a data radio bearer in accordance with one embodiment of the present invention.

Referring to FIG. 11, RRC connection is established between the user equipment and the network (S1110). Afterwards, the network identifies that a security error has occurred in the specific DRB (S1120). Whether a security error has occurred in the DRB can be identified by identifying whether a predetermined number of data packets have continuously failed in header compression. Afterwards, the network transmits a first message to the user equipment, wherein the first message indicates that the security error has occurred (S1130). The first message includes at least one of HFN of a transmitting PDCP entity (Tx HFN_EUTRAN) and HFN of a receiving PDCP entity (Rx HFN_EUTRAN) used in the network. The user equipment re-configures a specific DRB where the security error has occurred, with the HFN_EUTRAN after receiving the first message (S1140). Afterwards, the user equipment transmits a second message to the network in response to the first message (S1150).

Figure 12:
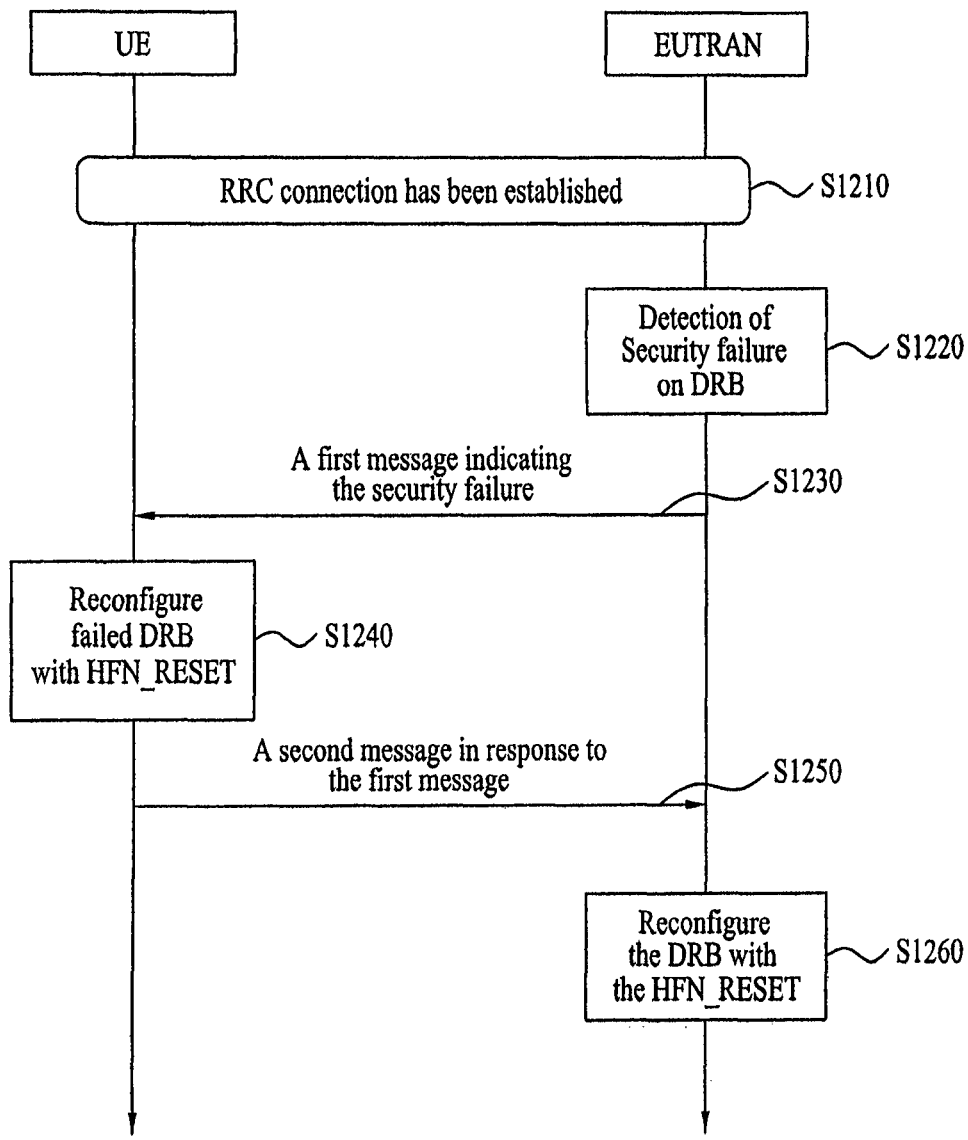
FIG. 12 is a diagram illustrating an example of a method of repairing a security error of a data radio bearer in accordance with another embodiment of the present invention.

Referring to FIG. 12, RRC connection is established between the user equipment and the network (S1210). The network identifies that a security error has occurred in the DRB (S1220). Afterwards, the network transmits a first message to the user equipment, wherein the first message indicates that the security error has occurred (S1230). The user equipment re-configures a specific DRB where the security error has occurred, with a specific value HFN_RESET, which is previously determined, after receiving the first message (S1240). The HFN_RESET is equally applied to the user equipment and the network. The HFN_RESET may be indicated by the upper layer of the PDCP layer or the network. Afterwards, the user equipment transmits a second message to the network in response to the first message (S1250). The network which has received the second message determines that the user equipment has re-configured the DRB where the security error has occurred, with the HFN_RESET, and re-configures its DRB where the security error has occurred, with the HFN_RESET (S1260).

Figure 13:
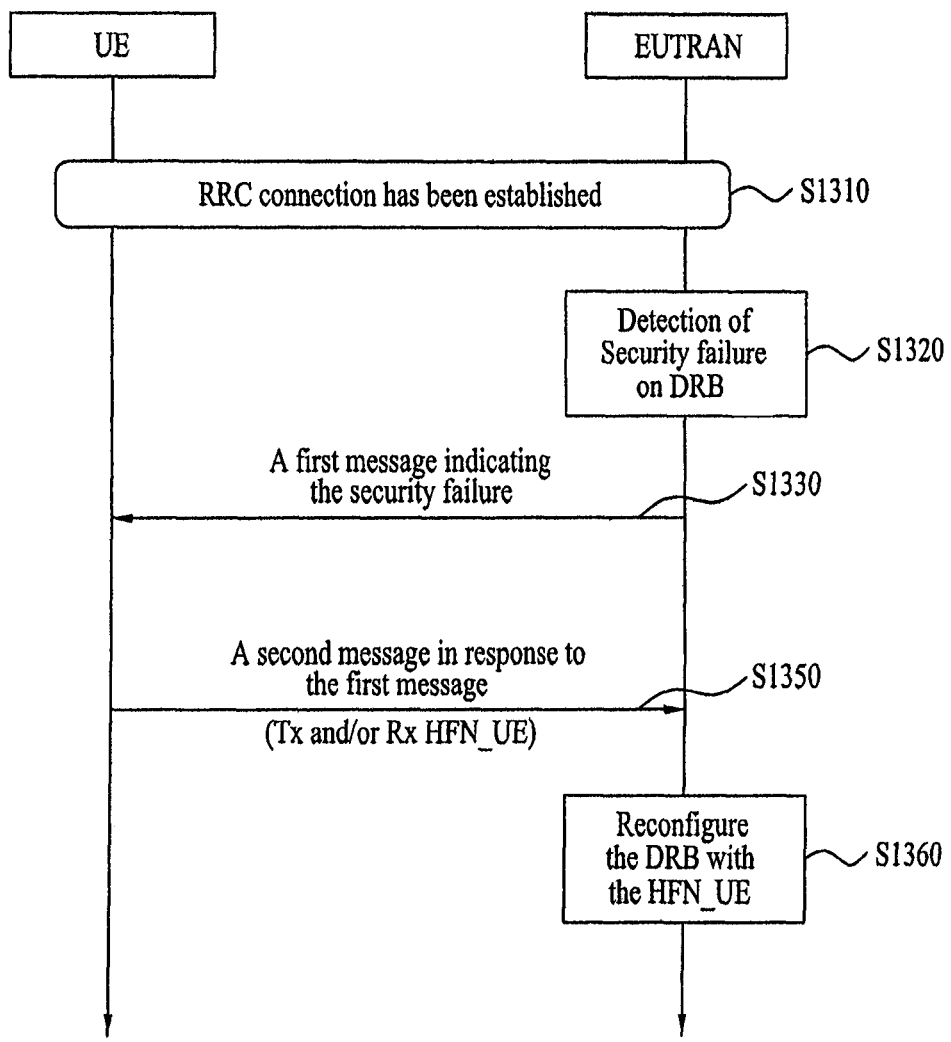
FIG. 13 is a diagram illustrating an example of a method of repairing a security error of a data radio bearer in accordance with other embodiment of the present invention.

Referring to FIG. 13, RRC connection is established between the user equipment and the network (S1310). The network identifies that a security error has occurred in the DRB (S1320). Afterwards, the network transmits a first message to the user equipment, wherein the first message indicates that the security error has occurred (S1330). The user equipment transmits a second message to the network in response to the first message after receiving the first message (S1350). The second message includes at least one of HFN of a transmitting PDCP entity (Tx HFN_UE) and HFN of a receiving PDCP entity (Rx HFN_UE) used in the user equipment. The network which has received the second message re-configures the specific DRB where the security error has occurred, with the HFN_UE included in the second message (S1360).

The steps illustrated in FIG. 11 to FIG. 13 can be performed through PDCP PDU or RRC signaling. Hereinafter, each case will be described in more detail. The user equipment and the network are assumed to function in a same manner as illustrated in FIG. 11 to FIG. 13. However, if the user equipment identifies that the security error has occurred in the specific DRB, the user equipment and the network are functioned in opposite to functions illustrated in FIG. 11 to FIG. 13.

A. Synchronization of HFN Using PDCP Reset Procedure i. The PDCP layer of the network configures a first PDCP PDU which indicates that a security error has occurred, if it determines that the security error has occurred in the DRB. For convenience, the first PDCP PDU will be referred to as RESET PDU. Afterwards, the network transmits the PDCP RESET PDU to a peer PDCP layer of the user equipment (S1130, S1230, and S1330 in FIG. 11 to FIG. 13). The RESET PDU can include HFN of the transmitting PDCP entity (Tx HFN_EUTRAN) and/or HFN of the receiving PDCP entity (Rx HFN_EUTRAN) of the network (S1130 in FIG. 11).

ii. The PDCP layer of the user equipment, which has received RESET PDU, recognizes that the security error has occurred in a peer PDCP layer of the network. Afterwards, the user equipment can re-configure its HFN (Tx HFN_UE and/or Rx HFN_UE). As illustrated in FIG. 11 to FIG. 13, the user equipment which has received RESET PDU can be operated by the three following cases.

in the case that HFN of the network is included in PDCP RESET PDU:
   Case 1. HFN of the PDCP layer is re-configured equally to the network (S1140 in FIG. 11)
in the case that HFN of the network is not included in PDCP RESET PDU:
   Case 2. HFN of the PDCP layer is re-configured to a previously determined value (S1240 in FIG. 12)
   Case 3. HFN of the PDCP layer is used without change iii. After performing a required operation in accordance with the above three cases, the user equipment configures a second PDCP PDU in response to the RESET PDU and transmits the second PDCP PDU to the network (S1150, S1250 and S1350 in FIG. 11 to FIG. 13). For convenience, the second PDCP PDU will be referred to as RESET ACK PDU. In case of the Case 3, the RESET ACK PDU includes HFN of the transmitting PDCP entity (Tx HFN_UE) and/or HFN of the receiving PDCP entity (Rx HFN_UE) of the user equipment (S1350 in FIG. 13).

iv. If the network receives the RESET ACK PDU, the network recognizes that the PDCP layer of the user equipment has performed the operation required to repair the security error of the DRB. Afterwards, the operation of the network can be performed by the following three cases.

Case 1. HFN of the PDCP layer is used without change.
Case 2. HFN of the PDCP layer is re-configured to a previously determined value (S1260 in FIG. 12).
Case 3. HFN of the PDCP layer is re-established equally to the user equipment (S1360 in FIG. 13).

B. Synchronization of HFN Using RRC Signaling i. The PDCP layer of the network notifies the upper layer, i.e., RRC layer that a security error has occurred in the PDCP layer, if it determines that the security error has occurred in the PDCP layer. The RRC layer identifies that the security error relates to what RB, using information of RB establishment. If the type of the RB is SRB, the network starts the procedure of re-establishing RRC connection. If the type of the RB is DRB, the network configures a first RRC message, which indicates that the security error has occurred in the DRB, and transmits the first RRC message to the user equipment (S1130, S1230, and S1330 in FIG. 11 to FIG. 13). For example, the first RRC message may be a message for releasing RRC connection. The first RRC message can include HFN of the transmitting PDCP entity (Tx HFN_EUTRAN) and/or HFN of the receiving PDCP entity (Rx HFN_EUTRAN), where the security error has occurred (S1130 in FIG. 11). If the security error has occurred in several PDCP layer simultaneously, the first RRC message can include information of several RBs (including SRB) where the security error has occurred.

ii. The user equipment, which has received the first RRC message, recognizes that the security error has occurred in the DRB of the network. Afterwards, the user equipment can re-establish DRB indicated by the first RRC message. Also, the user equipment can re-configure HFN (Tx HFN_UE and/or Rx HFN_UE) of the DRB. As illustrated in FIG. 11 to FIG. 13, the user equipment which has received the first RRC message can be operated by the three following cases.

in the case that HFN of the network is included in the first RRC message:
   Case 1. the indicated DRB is re-configured to HFN of the network (S1140 in FIG. 11)
in the case that HFN of the network is not included in the first RRC message:
   Case 2. the indicated DRB is re-configured to a previously determined value (S1240 in FIG. 12)
   Case 3. the indicated DRB is used without change iii. After performing a required operation in accordance with the above three cases, the user equipment configures a second RRC message in response to the first RRC message and transmits the second RRC message to the network (S1150, S1250 and S1350 in FIG. 11 to FIG. 13). In case of the Case 3, the second RRC message includes HFN (Tx HFN_UE and/or Rx HFN_UE) of the user equipment.

iv. If the network receives the second RRC message, the network recognizes that the user equipment has performed the operation required to repair the security error of the DRB. Afterwards, the operation of the network can be performed by the following three cases.

Case 1. DRB where the error has occurred is used without re-establishment.
Case 2. DRB where the error has occurred is re-configured to a previously determined HFN (S1260 in FIG. 12).
Case 3. DRB where the error has occurred is re-configured HFN of the user equipment (S1360 in FIG. 13).

As described above, according to the embodiment of the present invention, if the security error has occurred in the PDCP layer of the receiving side, different kinds of solutions are suggested depending on the type of RB, whereby service quality is prevented from being deteriorated unnecessarily.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method of re-establishing a radio bearer in a wireless communication system.

What is claimed is:

1. A method of re-establishing one or more radio bearers at a user equipment in a wireless communication system, the method comprising:
   establishing one or more data radio bearers and one or more signaling radio bearers;
   receiving a message indicating that an error has occurred in a radio bearer; and
   re-establishing only the radio bearer only when the radio bearer is a data radio bearer; and
   re-establishing all of the one or more data radio bearers and the one or more signaling radio bearers when the radio bearer is a signaling radio bearer,
   wherein if the message includes a value for a security-related parameter, one or more corresponding radio bearers are re-established using the received value for the security-related parameter,
   wherein if the message does not include any value for the security-related parameter, one or more corresponding radio bearers are re-established using a pre-defined value for the security-related parameter.

2. The method of claim 1, wherein the error is a security failure.

3. The method of claim 1, wherein re-establishing the one or more corresponding radio bearers includes synchronizing a desynchronized value for the security-related parameter between the user equipment and a network.

4. The method of claim 1, wherein the security-related parameter includes a hyper frame numbers (HFN).

5. The method of claim 1, wherein the message is a packet data convergence protocol (PDCP) data unit or a radio resource control (RRC) signaling message.

6. The method of claim 4, wherein the HFN includes at least one of a transmitting HFN and a receiving HFN.

7. The method of claim 1, wherein re-establishing all of the one or more data radio bearers and the one or more signaling radio bearers includes re-establishing RRC connection.

* * * * *